United States Patent [19]

Deering

[11] Patent Number: 5,023,617

[45] Date of Patent: Jun. 11, 1991

[54] VEHICLE FORWARD SENSOR ANTENNA STEERING SYSTEM

[75] Inventor: Richard K. Deering, Mt. Clemens, Mich.

[73] Assignee: General Motors Corporation, Detroit, Mich.

[21] Appl. No.: 483,037

[22] Filed: Feb. 20, 1990

[51] Int. Cl.$^5$ .............................................. G01S 9/46
[52] U.S. Cl. ..................................................... 342/70
[58] Field of Search .................... 356/5; 342/70, 71

[56] References Cited

U.S. PATENT DOCUMENTS

| | | | |
|---|---|---|---|
| 3,442,347 | 5/1969 | Hodgson et al. | 180/169 |
| 4,158,841 | 6/1979 | Wüchner et al. | 342/70 |
| 4,165,511 | 8/1979 | Wocher et al. | 342/70 |
| 4,632,543 | 12/1990 | Endo | 356/5 |

Primary Examiner—Mark Hellner
Attorney, Agent, or Firm—Howard N. Conkey

[57] ABSTRACT

A transmitted and received beam of a forward looking sensor of a source vehicle is steered as the source vehicle travels through a curvilinear path so that the steering angle is controlled to prevent the loss of detection of a target vehicle resulting from the effective lateral shaft of the beam relative to the path as the beam is steered into the curvilinear path. The beam is steered at an angle that limits the effective lateral shift of the beam relative to the curvilinear path such that a predetermined minimum target vehicle detection criteria is achieved.

11 Claims, 3 Drawing Sheets

VEHICLE FORWARD SENSOR ANTENNA STEERING SYSTEM

BACKGROUND OF THE INVENTION

Various automotive vehicle control systems such as forward obstacle detection systems or speed control systems for maintaining the distance to another vehicle, utilize sensors to detect objects in the vehicle path. In general, these sensors transmit a beam of defined width forward of the source vehicle and sense a reflection of the beam from a forward object such as a another vehicle. Typical sensors used in these systems include microwave radar sensors and infrared sensors.

If the forward looking sensor of these systems is fixed to look directly ahead of the source vehicle, it will effectively monitor the path of the source vehicle when the source vehicle's trajectory is a straight line. When the source vehicle's motion becomes curvilinear, there is an effective shift of the path of the source vehicle relative to the beam of the sensor. This effective shift is greater as distance increases within the maximum range of the sensor. This shift may result in the sensor not detecting a target in the source vehicle's path which is within the range of the sensor. Further, the sensor may detect false targets or clutter such as vehicles following different paths or guard rails adjacent the roadway which are ahead of the source vehicle but not within the source vehicle's path.

It has been proposed to maximize the useful range of the sensor and to avoid the detection of unwanted targets by steering the beam of the sensor, such as by rotating the antenna of a radar sensor, as the source vehicle travels through a curvilinear path. However, when the beam is steered so as to maximize the useful range of the sensor, there is a potential of a target vehicle within the source vehicle's path to become undetectable due to an effective lateral shift of the target vehicle out of the beam for some arc length of the curvilinear path as the range to the target vehicle decreases from the maximum range of the sensor along this path or not be detected such as when a target vehicle enters into this arc length of the source vehicle's path from another trajectory.

SUMMARY OF THE INVENTION

This invention provides for the simultaneous steering of the transmitted and received beams of a forward looking sensor of a source vehicle as the source vehicle travels through a curvilinear path in which the sensor steering angle is controlled so as to prevent the loss of detection of a target vehicle resulting from the effective lateral shift of the beam relative to the source vehicle's path as the beam is steered into a curvilinear path.

According to one aspect of this invention, the beam is steered at an angle that limits the effective lateral shift of the beam relative to the projected path of the vehicle such that a predetermined minimum detection criteria is achieved. In one embodiment, the minimum detection criteria is represented by a predetermined portion of the beam intersecting a target vehicle located at the point of maximum lateral shift of the beam relative to the source vehicle's projected path. In another embodiment, the minimum detection criteria is defined by a predetermined maximum lateral shift of the beam relative to the projected path. In one form of the invention, the predetermined maximum lateral shift is related to the width of a vehicle such that the centerline of the beam is not shifted beyond the edge of a target vehicle.

As contemplated by a further aspect of the invention, the steering angle of the beam is controlled based upon a determined radius of the source vehicle's projected path.

The invention may be best understood by reference to the following description of the invention and the drawings in which.

DESCRIPTION OF A PREFERRED EMBODIMENT

Figure 1:
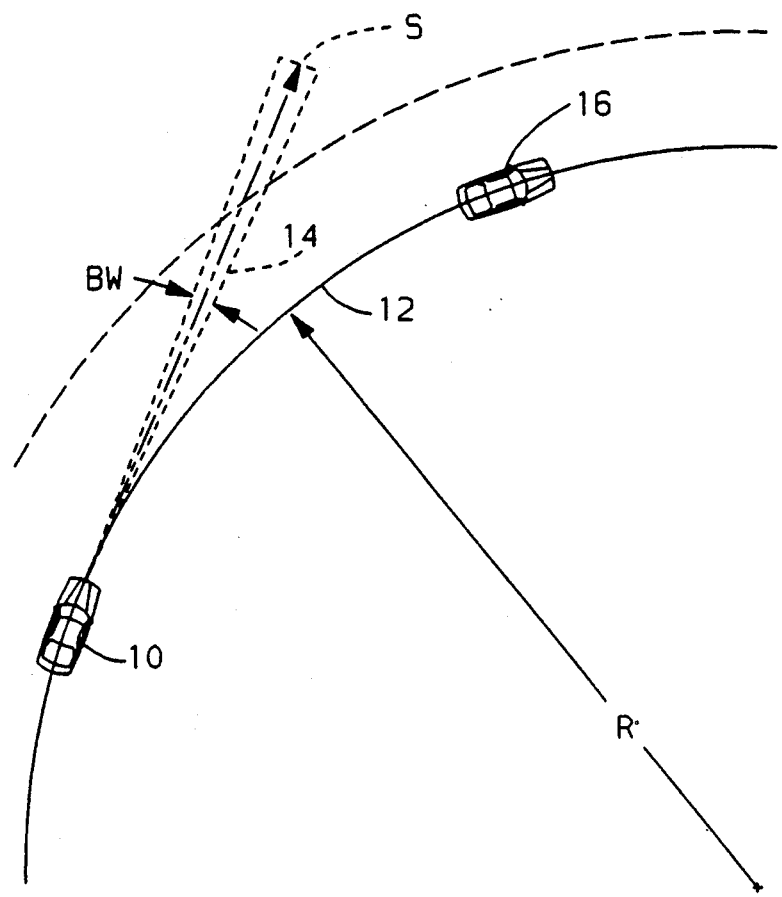
FIG. 1 illustrates a vehicle forward detection system whose sensor beam is fixed.

FIG. 1 illustrates the conditions resulting from a vehicle forward detection system having a sensor (such as a radar sensor) transmitting a fixed beam as the vehicle travels through a curvilinear path. The detection system is carried on a source vehicle 10 and transmits a beam 14 having a beamwidth BW and a maximum useful range S. The path of the source vehicle is represented by its centerline 12 having a radius R. As can be seen, due to the curvature of the path away from the beam 14, there is an effective lateral shift between the beam 14 of the sensor and the path that increases with distance. In the case where a target vehicle 16 is in the path ahead of the source vehicle 10, the effective lateral shift between the sensor beam 14 and the target vehicle 16 results in the target vehicle 16 shifting out of the detection zone of the beam 14 even at relative short ranges. Further, the sensor may sense false targets or clutter such as vehicles following different paths or guard rails adjacent the roadway which are not within the source vehicle's path.

Figure 2:
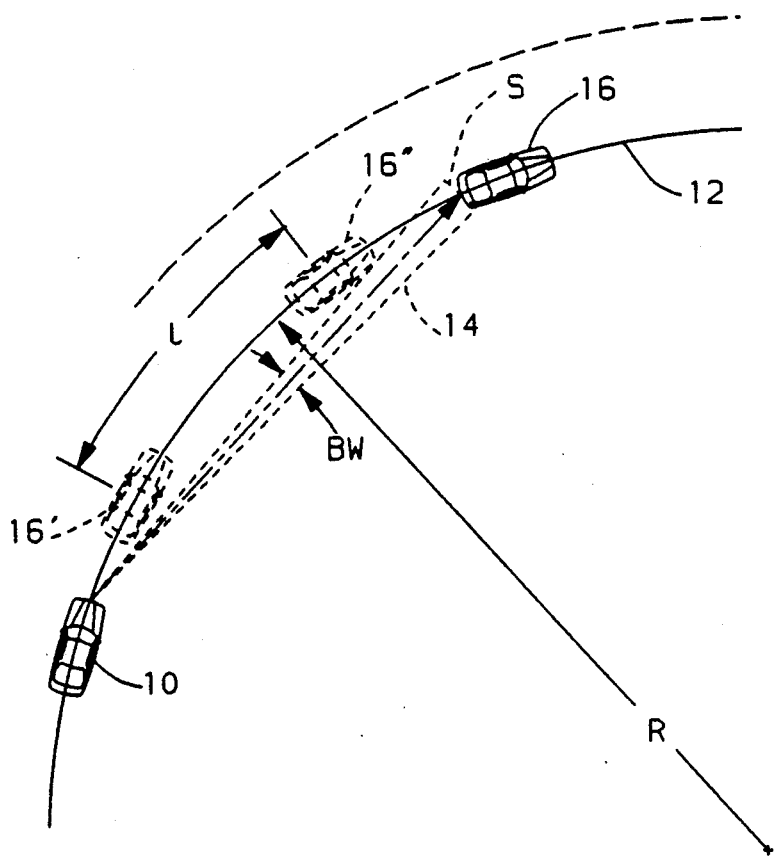
FIG. 2 illustrates a vehicle forward detection system whose sensor beam is steered to maximize the useful range of the sensor.

FIG. 2 illustrates the conditions resulting from the vehicle forward detection system of FIG. 1 but where the sensor beam 14 is steered when the source vehicle 10 travels through the curvilinear path so as to use the maximum range of the sensor. This is accomplished by steering the beam 14 so as to intersect the path of the source vehicle 10 at the maximum range. As can be seen, there is an effective lateral shift between the beam 14 and the path that would result in target vehicles (such as the vehicles 16' and 16") shifting out of the detection zone of the beam 14 over the arc length 1 of the path 12. Vehicles entering the path in this region from another trajectory would also not be detected.

Figure 3:
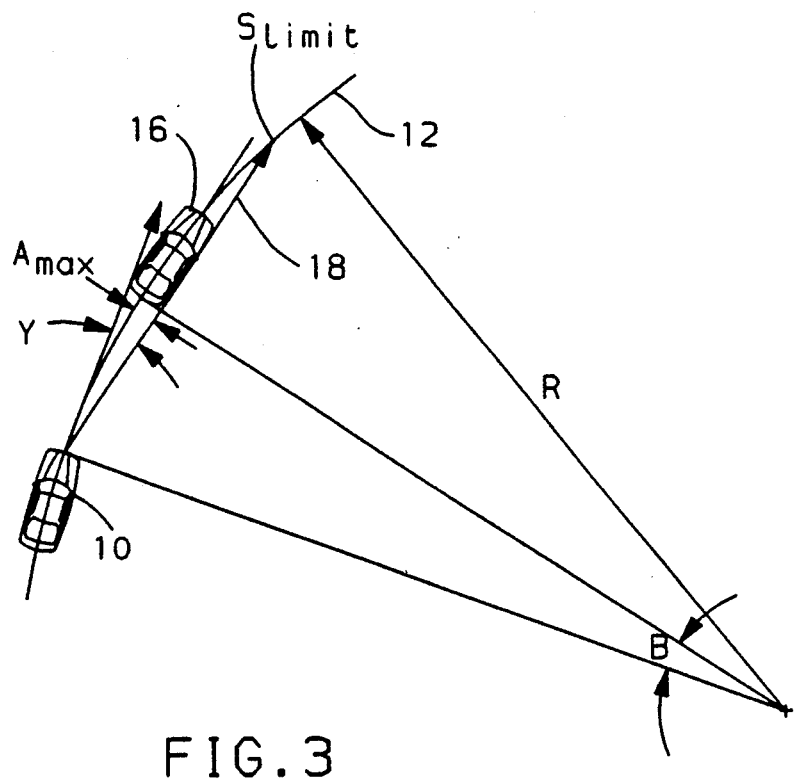
FIGS. 3 and 4 illustrate a vehicle forward detection system whose sensor beam is steered in accord with the principles of this invention.
Figure 4:
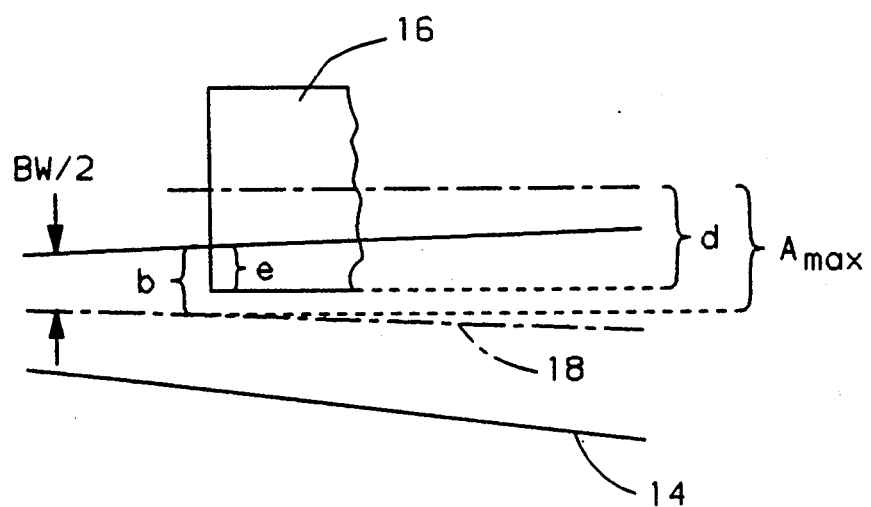

FIGS. 3 and 4 generally illustrate this invention wherein the beam 14 of the source vehicle 10 forward looking sensor is steered into a curvilinear path at a sensor steering angle Y that increases the detection zone of the sensor as compared to the fixed beam case of FIG. 1 and which prevents the loss of detection of a target vehicle resulting from the effective lateral shift of the beam relative to the path as the beam is steered into the curvilinear path as occurred with the case of the steered beam of FIG. 2.

The parameters illustrated in FIGS. 3 and 4 are defined as follows: (1) Y is the steering angle of the beam 14 and is the angle of the centerline 18 of the beam 14 from the velocity vector of the vehicle, (2) $S_{limit}$ is substantially the limited useful range of the sensor and is the distance from the source vehicle 10 to the intersection of the beam centerline 18 with the centerline 12 of the path of the source vehicle 10, (3) $A_{max}$ is the maximum lateral shift between the path centerline 12 and the beam centerline 18 for a given steer angle Y and path curvature and which occurs at a distance $S_{limit}/2$, (4) B is ½ the angle of the arc segment defined by the beam centerline 18, (5) b is ½ the width of the beam 14 at the distance $S_{limit}/2$, (6) d is ½ the width of the target vehicle 16, (7) e is the width of the beam 14 irradiating the target vehicle 16 (the beam/vehicle overlap), (8) R is the radius of a circle defined by the path of the vehicle represented by the path centerline 12 and (9) BW is the angular beam width. In carrying out the invention, the path ahead of the source vehicle 10 having the centerline 12 is a projected path determined in the preferred embodiment from the steering angle and velocity of the source vehicle 10. In another embodiment, the projected path is determined from the steering angle alone.

In general, the beam 14 is steered to a value of Y so that a determined value of $A_{max}$ is provided that is based upon a minimum detection criteria. In one embodiment, $A_{max}$ is made equal to ½ the width of a source vehicle. In another embodiment the value of $A_{max}$ is computed such that a desired minimum percent of the beam width BW always irradiates the target vehicle 16 over the range $S_{limit}$.

The following relationships between the foregoing parameters can be shown:

$$Y = B, \quad (1)$$

$$S_{limit} = 2R \sin Y + \Delta S \quad (2)$$

where ΔS generally accounts for the path width, $$Y_{limit} = \cos^{-1}[(R - A_{max})/R] \quad (3)$$

where $Y_{limit}$ is the value of the beam 14 steer angle Y resulting in the maximum lateral shift value $A_{max}$, $$e = d - A_{max} + b, \quad (4)$$

$$b = R \sin \{\cos^{-1}[(R - A_{max})/R]\} \tan (BW/2). \quad (5)$$

Assuming the beam 14 is to be steered so that a minimum percentage PCT of the beam will irradiate the target vehicle 16 when the target vehicle is at the distance $S_{limit}/2$, then $$PCT = e/2b = (b + d - A_{max})/2b \quad (6)$$

where $+b \geq (A_{max} - d) \geq -b$ and b is defined in the expression (5).

From expressions (5) and (6), it can be seen that if the desired value of PCT is chosen and since the values of d and BW are known or are assigned desired values, only $A_{max}$ and R are unknowns. However, R of the projected path of the source vehicle 10 can be determined from the driver input steering angle $D_d$ (the steering wheel position divided by the steering gear ratio) of the source vehicle and more accurately by also taking into account vehicle dynamics in accord with the general linear vehicle dynamics equation $$D_d = 57.3(A + B)/R + K_t V^2/R, \quad (7)$$

where A and B are the distances from the front and rear wheels of the source vehicle 10 to its center of gravity, Kt is a vehicle specific constant and V is the velocity of the source vehicle. Since $D_d$ and V can be measured, the expression (7) can then be solved for the radius R of the curvature of the projected path of the source vehicle. Using the determined value of R, the expression (6) can then be solved for $A_{max}$ as a function of the determined projected path curvature. The determined value of $A_{max}$ is the value providing the desired minimum percentage PCT of the radar beam that will intersect the target vehicle 16 (the minimum detection criteria). Once the value of $A_{max}$ is determined, the steer angle $Y_{limit}$ that will provide this minimum percentage can then be determined from expression (3).

It can be seen that for known and assigned values of beam width BW, target vehicle width d and minimum percent PCT of the beam width irradiating the target vehicle, a corresponding value of $Y_{limit}$ can be determined from a measurement of the radius R of the projected path of the source vehicle 10 which, in this embodiment is obtained via expression (7) from measurements of vehicle speed V and driver input steering angle $D_d$.

In another embodiment, the minimum detection criteria is the value of $A_{max}$ being a constant distance such as ½ the value of the narrowest target vehicle that may be encountered. This value is then substituted in expression (3) along with the determined radius R to determine the steer angle $Y_{limit}$.

By controlling the steer angle of the beam 14 to the angle $Y_{limit}$, the effective lateral shift of the beam 14 relative to the projected path is limited so that no target vehicle will be shifted out of the beam as the beam is steered while traveling through a curvilinear path. At the same time, the useful limited range $S_{limit}$ of the sensor is maximized. The value of this limit can be computed by expression (2) and used in the sensor for establishing range cutoff to prevent sensing of unwanted vehicles in different paths or railings, etc.

Figure 5:
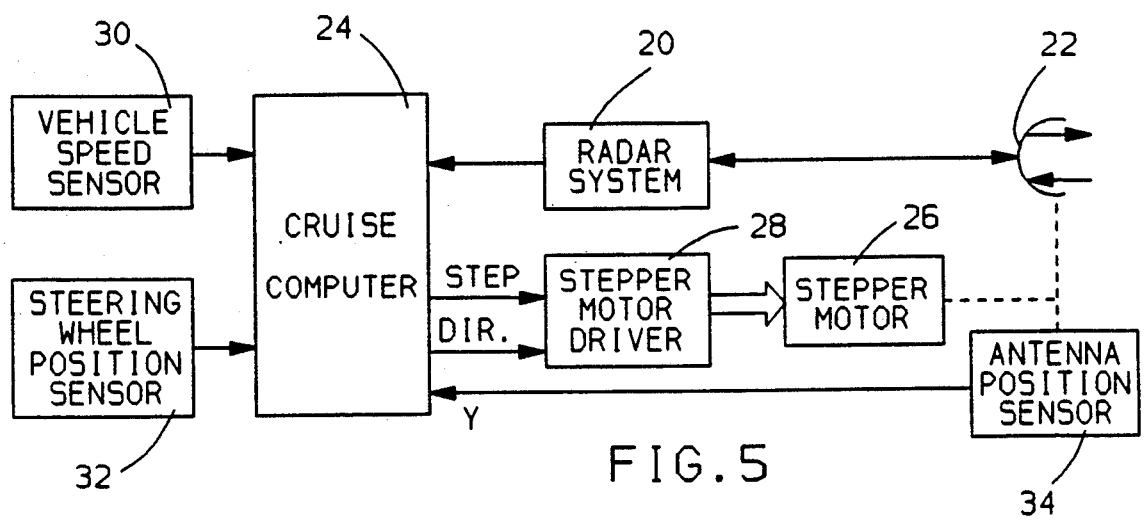
FIG. 5 illustrates a forward looking radar sensor system for a source vehicle in which the radar beam transmitted by the radar antenna is steered in accord with the principles of this invention.

Referring to FIG. 5, there is illustrated a system employed by the source vehicle 10 for sensing a target vehicle and for steering the beam 14 in accord with this invention. The system includes a radar system 20 of conventional design for determining range and/or range rate relative to a target vehicle such as the vehicle 16. The radar system transmits a microwave beam of known beam width BW forward of the vehicle via an antenna 22 that is mounted on the front of the source vehicle 10. This signal comprises the beam 14 previously referred to. A reflected microwave signal from a target vehicle 16 in the source vehicle's projected path is sensed by the antenna 22 and detected by the radar system 20 which in turn provides range and/or range rate information to a cruise computer 24.

The cruise computer 24 may provide source vehicle control functions in response to the information provided from the radar system 20. For example, the cruise computer may control the speed of the source vehicle 10 to maintain a desired spacing from the target vehicle 16 in a manner as illustrated in copending application G-2982 assigned to the assignee of this invention.

The antenna 22 is rotatable to steer the radar beam transmitted and received thereby by means of a stepper motor 26. For example, the antenna may be mounted on a platform that is rotatable about a vertical axis by rotation of an input shaft coupled to the output shaft of the motor 26. The stepper motor 26 is controlled by the cruise computer 24 via a stepper motor driver 28 to rotate antenna 22 to steer the radar beam 14. In general, the stepper motor driver 28 steps the stepper motor 26 one incremental angle for each step command from the computer 24 in the direction commanded by the computer 24.

The cruise computer 24 determines a desired radar beam limit steer angle $Y_{limit}$ as described above in response to vehicle speed V provided by a vehicle speed sensor 30 and a driver input steering angle $D_d$ provided by a steering wheel position sensor 32. Based on the actual antenna angular position (the beam angle Y) provided by an antenna position sensor 34, the cruise computer 24 determines motor direction and the number of stepper motor steps to be issued to the stepper motor 26 in order to establish the desired steer angle $Y_{limit}$. The number of steps and motor direction are provided to the stepper motor driver 28 which steps the stepper motor 26 by the required number of steps in the determined direction.

Figure 6:
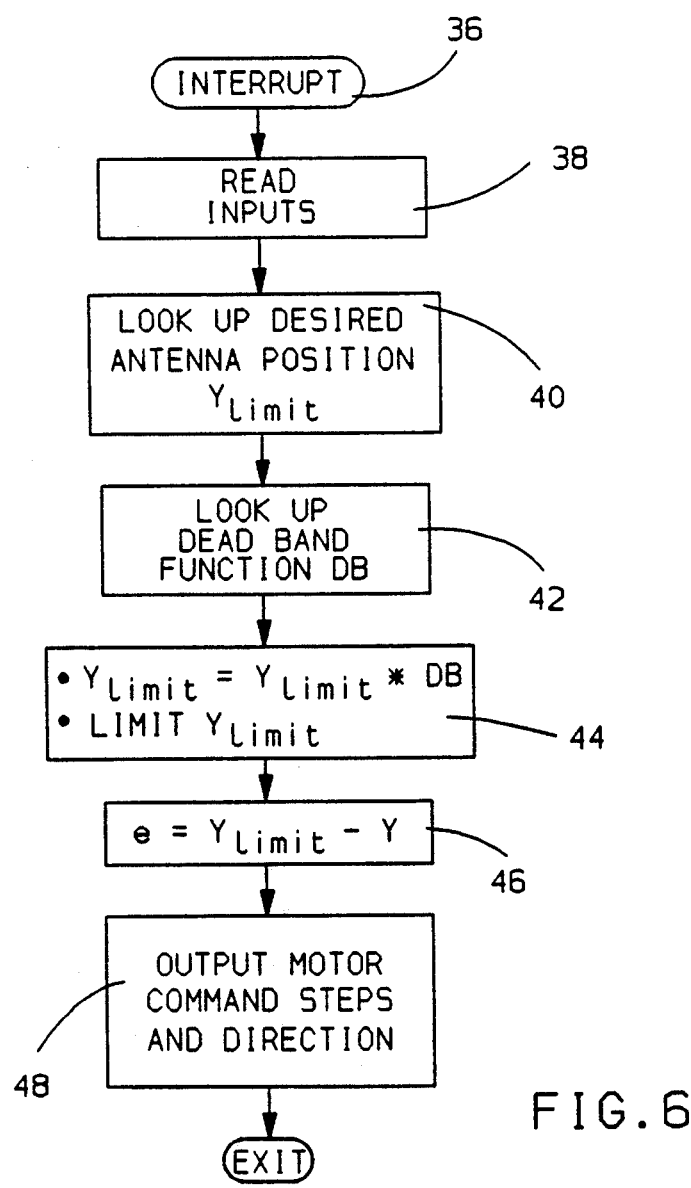
FIG. 6 is a flow diagram illustrating the operation of the system of FIG. 5 in steering the radar beam.

The cruise computer 24 takes the form of a conventional general purpose digital computer programmed to control the angle of the antenna 22 and therefore the radar beam angle Y in accord with this invention. The computer generally is comprised of a read-only memory, a random access memory, an analog to digital converter, a central processing unit and an input-output section for interfacing with the external devices. The read-only memory of the computer 24 contains the instructions necessary to implement its control algorithms in addition to storing constants, lookup tables, etc. utilized in carrying out the various tasks. The flow diagram of FIG. 6 illustrates the control algorithm of the cruise computer in controlling the steering of the radar beam 14. The specific programming of the read-only memory for carrying out the functions depicted in the flow diagram of FIG. 6 may be accomplished by standard skill in the art using conventional information processing languages.

While the digital computer employed in the cruise computer 24 may take any conventional form, one such form may be the single chip Motorola microcomputer MC-68HC11. Alternatively, multiple processors or other circuit forms may be employed.

Referring to FIG. 6, the operation of the cruise computer 24 for controlling the steer angle Y of the radar beam 14 by control of the angular position of the antenna 22 is illustrated. This routine is executed at repeated interrupt intervals established by an internal timer. Upon the occurrence of the time interrupt, the routine in entered at step 36 and proceeds to read the various input values including the vehicle speed V, the steering wheel position $D_d$ and the antenna angular position Y. This step may also include filtering of input values if required.

At the step 40, the desired antenna position $Y_{limit}$ is determined to establish the desired minimum detection criteria. In this embodiment, $Y_{limit}$ is determined to establish a maximum lateral shift value $A_{max}$ that in turn establishes a predetermined minimum percent PCT (such as 30%) of the beam width on a target vehicle. In this embodiment, the antenna position $Y_{limit}$ is obtained from a lookup table storing antenna steer angle $Y_{limit}$ as a function of vehicle speed and steering wheel position. The basis for this lookup table is the expressions set forth above and is summarized as follows. For each combination of vehicle speed and steering wheel position, there is a corresponding projected path curvature radius R determined from the expression (7). For each determined radius R, there is a corresponding value of $A_{max}$ for the known beamwidth BW of the radar beam, assumed target vehicle width d and desired minimum percentage PCT of the radar beam to irradiate the target vehicle. Finally, for each value of $A_{max}$ and radius R, there is a corresponding steering angle $Y_{limit}$ determined from the expression (3). Using these relationships, a table of values of antenna steering angle $Y_{limit}$ is stored in the read-only memory of the cruise computer 24 as a function of vehicle speed and steering wheel position.

It is not desirable to steer the antenna to the steer angle $Y_{limit}$ for normal straight path steering corrections by the vehicle operator. These normal straight path corrections are represented by steering wheel angles less than a predetermined calibration value from a centerline position. To prevent antenna steering at steering wheel angles less than the predetermined value, a deadband function is stored in a lookup table in the the read-only memory as a function of the steering wheel position angle relative to centerline position. In general, the deadband function has a value of zero for values of the driver input steering angle $D_d$ less than the predetermined value and increasing to unity as the driver input steering angle increases above the predetermined value. The deadband function DB is obtained from the lookup table at step 42. At step 44, the steering angle $Y_{limit}$ determined at step 40 is multiplied by the deadband function determined at step 42 to prevent the steering of the antenna 22 for normal straight path steering corrections. The resulting value is then limited to a maximum allowable antenna steer angle.

At the next step 46 the error e in the position of the antenna steering angle is determined in accord with the expression $e = Y_{limit} - Y$. At step 48 the required stepper motor direction (based on the sign of the error e) and the number of output steps for correcting the antenna steering angle error determined at step 46 is determined and output to the stepper motor driver 28. The number of output steps is determined according to the expression output = G*e, where G is a gain function dependent on the error, G=f(e), with a value from 0 to 1. In another embodiment, G is a constant. An error deadband may be provided wherein no corrections in the steer angle of the antenna is provided for errors within the deadband. In the preferred embodiment, the step 48 outputs the steps to the stepper motor driver 28 sequentially at a predetermined rate to limit the slewing rate of the antenna. For example, step 48 may output the step commands to the stepper motor driver 28 at 30 ms intervals by repeatedly executing a 30 ms sub-loop until the required number of steps have been commanded. This method of commanding the stepping of the stepper motor 26 limits the slewing rate of the antenna 22 to a predetermined vehicle steering wheel input rate and functions to filter rapid steering wheel position inputs. Following the step 48, the program exits the routine.

By the foregoing routine, the antenna steering angle and its radiated radar beam is controlled as the source vehicle travels through a curvilinear path to establish the radar beam angle such that the desired minimum detection criteria is established.

The foregoing description of a preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. The method of steering a beam transmitted and received by a forward looking sensor of a source vehicle traveling through a curvilinear path in response to an operator steering input, the method comprising the steps of:

measuring the operator steering input;

determining a beam steering angle in accord with a predetermined function including the measured operator steering input that results in a lateral shift of the beam relative to the path as the beam is steered to the determined angle that establishes a predetermined minimum overlapping relationship between the beam and a target vehicle in the path ahead of the source vehicle; and steering the beam to the determined beam steering angle, whereby the beam of the sensor is steered to an angle that provides for the minimum overlapping relationship between the beam and the target vehicle while traveling through the curvilinear path.

2. The method of claim 1 wherein the beam has a predetermined beam width and the predetermined overlapping relationship is a predetermined percentage of the beam width.

3. The method of claim 1 further including the step of measuring source vehicle velocity and wherein the predetermined function further includes source vehicle velocity.

4. The method of steering a beam transmitted and received by a forward looking sensor on a source vehicle traveling through a curvilinear path in response to an operator steering input, the method comprising the steps of:

measuring the operator steering input;

determining the radius of a projected curvilinear path of the source vehicle in accord with a predetermined function including the measured operator steering input;

determining a beam steering angle as a predetermined function of the determined radius of the projected curvilinear path and a maximum allowable shift of the beam relative to the projected curvilinear path that defines a minimum overlapping relationship between the beam and a target vehicle in the projected curvilinear path ahead of the source vehicle; and steering the beam to the determined beam steering angle, whereby the beam of the sensor is steered to an angle that provides for the minimum overlapping relationship between the beam and the target vehicle while traveling through the curvilinear path.

5. The method of claim 4 wherein the step of steering the beam is inhibited for measured operator steering inputs less than a predetermined value representing normal straight path steering corrections so that the beam is not steered in response to normal straight path steering corrections.

6. The method of claim 4 further including the step of determining a limited range $S_{limit}$ of the forward looking sensor in accord with the expression $S_{limit} = 2R \sin Y + \Delta S$ where R is the determined radius, Y is the determined beam steering angle and $\Delta S$ is a predetermined function of the curvilinear path width.

7. The method of steering a beam transmitted and received by a forward looking sensor on a source vehicle traveling through a curvilinear path in response to an operator steering input so as to detect a target vehicle in the curvilinear path, the beam having a beam centerline and a beam width BW, the method comprising the steps of:

measuring the operator steering input;

determining the radius R of a projected curvilinear path of the source vehicle in accord with a predetermined function including the measured operator steering input, the projected curvilinear path having a centerline;

determining a beam steering angle $Y_{limit}$ in accord with the expression $Y_{limit} = \cos^{-1}[(R - A_{max})/R]$ where $A_{max}$ is a maximum lateral distance between the projected path centerline and the beam centerline; and steering the beam to the determined beam steering angle $Y_{limit}$.

8. The method of claim 7 wherein the target vehicle has an assumed width 2d and $A_{max}$ is equal to d.

9. The method of claim 7 wherein $A_{max}$ is a predetermined function of the determined radius, the beam width BW, the target vehicle width 2d and a minimum percentage PCT beamwidth irradiation of the target vehicle.

10. The method of claim 7 wherein the step of steering the beam includes the steps of:

measuring the actual steering angle Y of the beam;

determining a steering angle error e in accord with the expression $e = Y_{limit} - Y$; and adjusting the steering angle of the beam by an amount based on a value $G*e$ where G is a gain value and in direction reducing the steering angle error.

11. The method of claim 10 wherein the step of adjusting the steering angle provides for the adjustment at a predetermined maximum rate.

* * * * *